(12) United States Patent
Yao et al.

(10) Patent No.: US 7,199,930 B2
(45) Date of Patent: Apr. 3, 2007

(54) LIGHT MODULATION ELEMENT

(75) Inventors: Po-Hung Yao, Luzhu Shiang (TW);
I-Kai Pan, Kaohshiung (TW);
Heng-Chun Huang, Miaoli (TW);
Yu-Nan Pao, Zhubei (TW); Yi-Ting Sun, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 73 days.

(21) Appl. No.: 11/150,101

(22) Filed: Jun. 13, 2005

(65) Prior Publication Data

US 2006/0238874 A1 Oct. 26, 2006

(30) Foreign Application Priority Data

Apr. 22, 2005 (TW) .............................. 94112815 A (51) Int. Cl.
*G02B 27/10* (2006.01)
*G03B 21/60* (2006.01)
*F21V 5/00* (2006.01)
*G02F 1/1335* (2006.01)

(52) U.S. Cl. ...................... 359/619; 359/621; 359/624; 359/625; 359/455; 362/333; 362/339; 349/61; 349/112

(58) Field of Classification Search ................ 359/619, 359/621–625, 251, 455–457, 566, 569, 599, 359/831, 741, 742; 362/31, 32, 302, 309, 362/318, 330, 333, 339; 349/10, 61, 62, 349/65, 112; 385/36, 43, 133, 146
See application file for complete search history.

(56) References Cited

U.S. PATENT DOCUMENTS

| | | | | |
|---|---|---|---|---|
| 4,730,897 | A * | 3/1988 | McKechnie et al. | 359/452 |
| 6,046,846 | A * | 4/2000 | van de Ven | 359/455 |
| 6,091,547 | A | 7/2000 | Gardiner et al. | 359/625 |
| 6,356,389 | B1 * | 3/2002 | Nilsen et al. | 359/625 |
| 6,515,785 | B1 * | 2/2003 | Cobb et al. | 359/247 |
| 6,570,710 | B1 * | 5/2003 | Nilsen et al. | 359/625 |
| 6,665,118 | B2 * | 12/2003 | Yamaguchi et al. | 359/453 |
| 6,934,082 | B2 * | 8/2005 | Allen et al. | 359/487 |
| 7,116,476 | B2 * | 10/2006 | Suzuki et al. | 359/457 |

FOREIGN PATENT DOCUMENTS

JP 2001-324608 11/2001

* cited by examiner

*Primary Examiner*—Loha Ben
(74) *Attorney, Agent, or Firm*—Troxell Law Office PLLC (57) ABSTRACT

The present invention discloses a light modulation element, having a first optical surface and a second optical surface receiving an incident light, the light modulation element comprising: at least a transparent diffusion unit, for scattering the incident light, each being placed on the first optical surface; and at least a transparent collimation unit, for collimating the incident light, each being formed on top of the diffusion unit.

20 Claims, 8 Drawing Sheets

LIGHT MODULATION ELEMENT

FIELD OF THE INVENTION

The present invention relates to a light modulation element and the luminance control apparatus utilizing the same, and more particularly, to a light modulation element having at least a diffusion unit and at least a collimation unit formed on a surface thereof.

BACKGROUND OF THE INVENTION

Nowadays, it is commonly seen that backlight modules are used for electronic devices with flat panel displays, which includes devices as small as hand-held palm pilots and as large as big-screen TVs. A typical backlight consists of a light source, such as Cold Cathode Fluorescent (CCFL) or Light Emitting Diodes (LED), a light guide, a diff user, and a brightness enhancement film. The design challenge of a backlight module is to generate uniform illumination across the LCD surface and luminance that is high enough to produce good contrast in a day environment (so that you can see the display of a laptop computer or a handheld electronic device, for example, with the room lights on), by the cooperation of the diffuser and the brightness enhancement film. Although, Taiwan is now one of the three major production countries for Notebook PCs, the critical component, backlight modules, still has to be imported and there is a heavy reliance on foreign providers. Thus, it is imperative for Taiwan to establish the design and production technology. Moreover, a conventional backlight usually consists of a plurality of optical films, which is the cause of low luminous efficacy, high manufacture cost and low assembly yield, and so on.

Figure 1:
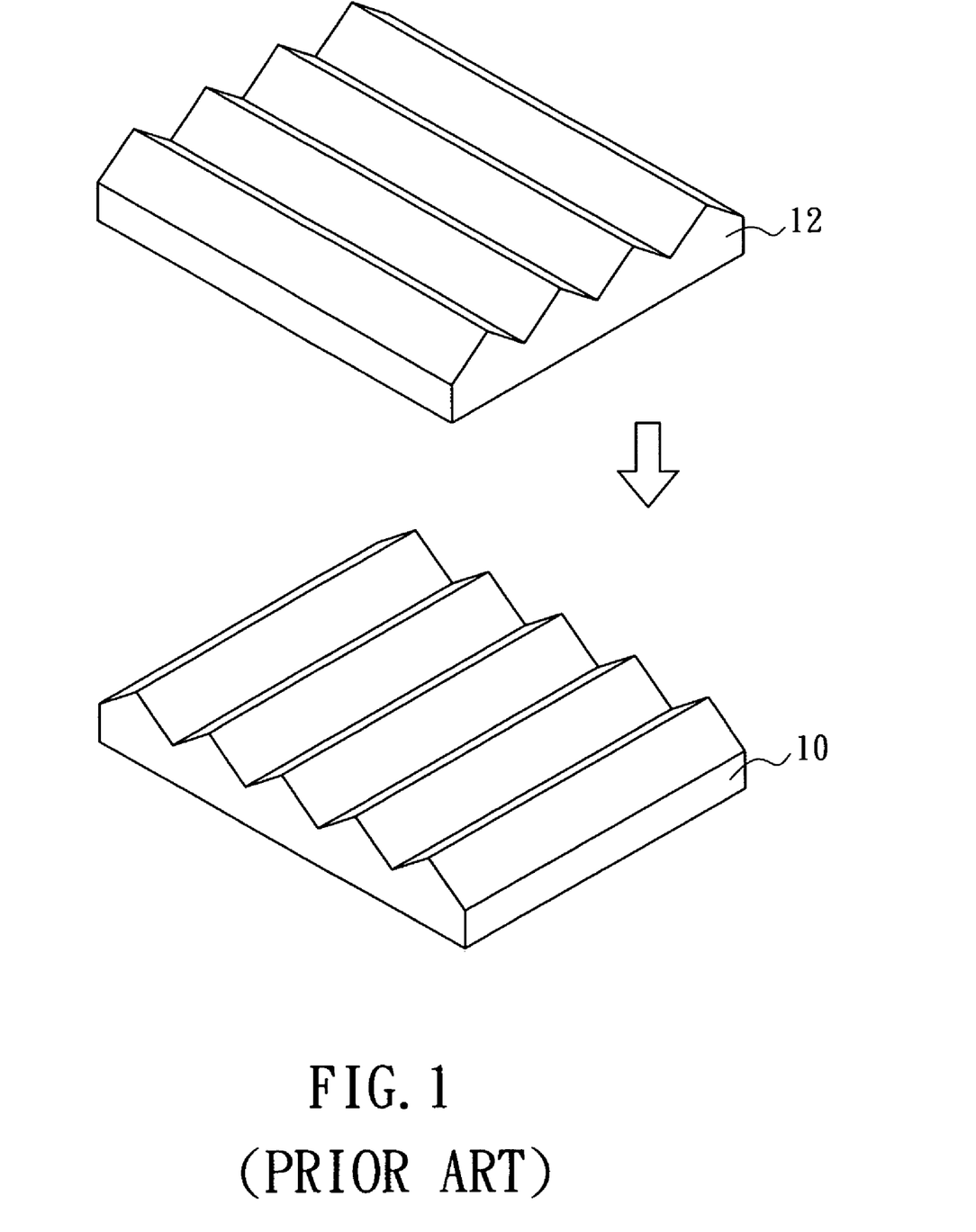
FIG. 1 is a perspective view of a luminance control film assembly disclosed in U.S. Pat. No. 6,280,063.

Please refer to FIG. 1, which is a perspective view of a luminance control film assembly disclosed in U.S. Pat. No. 6,091,547, entitled "Luminance Control Film". The luminance control film assembly of FIG. 1 is the formation of stacking a luminance control film 12 on top of another luminance control film 10, which can control and guide incident light to collimate for achieving the objects of improving on-axis luminance. However, the disclosed luminance control film is capable of collimating light effectively, it is disadvantageous by being able to diffuse incident light sufficiently enough to produce uniform illumination.

Figure 2:
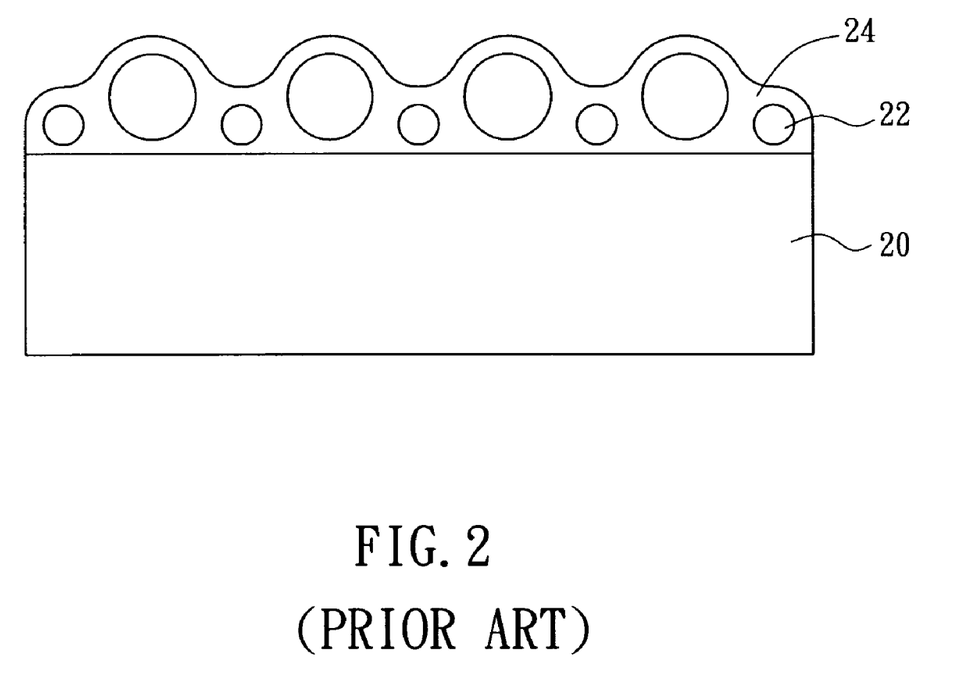
FIG. 2 is a cross-sectional view of a light-diffusing sheet disclosed in Japan. Pat. No. 2001324608.

Please refer to FIG. 2, which is a cross-sectional view of a light-diffusing sheet disclosed in Japan. Pat. No. 2001324608, entitled "Light-Diffusing Sheet". The light-diffusing sheet of FIG. 2 is substantially a layer of resin 24 formed on a transparent substrate 20 with a plurality of resin particles 22 of different diameter dispersed therein, which enables incident light to be scattered and thus diffused, but is disadvantageous by the effect of reducing luminous efficiency caused by the light-scattering of the plural particles 22.

Therefore, it is in great demand to have an improved light modulation element capable of overcoming the shortcomings of prior arts.

SUMMARY OF THE INVENTION

In view of the disadvantages of prior art, the primary object of the present invention is to provide a light modulation element with enhanced luminous efficiency, achieved by utilizing a plurality of microstructures with light collimation and diffusion capabilities formed thereon.

Another object of the invention is to provide a light modulation element and the luminance control apparatus utilizing the same, characterized in that the light modulation element is integrally manufactured by rolling a roller embossed with microstructures on an optical substrate for imprinting the microstructures thereon and thus the manufacturing cost of the light modulation element can be reduced.

To achieve the above objects, the present invention provides a light modulation element, having a first optical surface and a second optical surface for receiving an incident light, the light modulation element comprising:

at least a transparent diffusion unit, for diffusing the incident light, each being formed on the first optical surface; and at least a transparent collimation unit, for collimating the incident light, each being superposed on the diffusion unit.

In a preferred embodiment of the invention, the diffusion unit further comprises at least a semi-lenticular lens, characterized by a specific depth preferably in the range of 5 microns to 500 microns, moreover, the collimation unit further comprises at least a prism, characterized by a vertex angle preferably in the range of 30° to 140°, and a height preferably in the range of 0 micron to 500 microns.

In another preferred embodiment of the invention, the second optical surface can be an optical surface selected from the group consisting of a rugged surface and a smooth surface.

To achieve the above objects, the present invention further features a luminance control apparatus, comprising:

a reflector;

a light guide plate, arranged over the reflector;

at least a light source, arranged at a side of the light guide plate for emitting an incident light; and at least a light modulation element, arranged at a position over the light guide plate, each having a first optical surface and a second optical surface for receiving the incident light, each light modulation element further comprising:

at least a transparent diffusion unit, for diffusing the incident light, each being formed on the first optical surface; and at least a transparent collimation unit, for collimating the incident light, each being superposed on the diffusion unit.

In a preferred embodiment of the invention, the diffusion unit further comprises at least a semi-lenticular lens, characterized by a specific depth preferably in the range of 5 microns to 500 microns, moreover, the collimation unit further comprises at least a prism, characterized by a vertex angle preferably in the range of 30° to 140°, and a height preferably in the range of 0 micron to 500 microns.

In another preferred embodiment of the invention, the second optical surface can be an optical surface selected from the group consisting of a rugged surface and a smooth surface.

Yet, preferably, the luminance control apparatus of the invention can comprises two light modulation elements, wherein the orientation of one of the two light modulation elements is rotated by an angle range between 0° and 90° to be placed overlapping another light modulation element.

Other aspects and advantages of the present invention will become apparent from the following detailed description, taken in conjunction with the accompanying drawings, illustrating by way of examples about the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 3A:
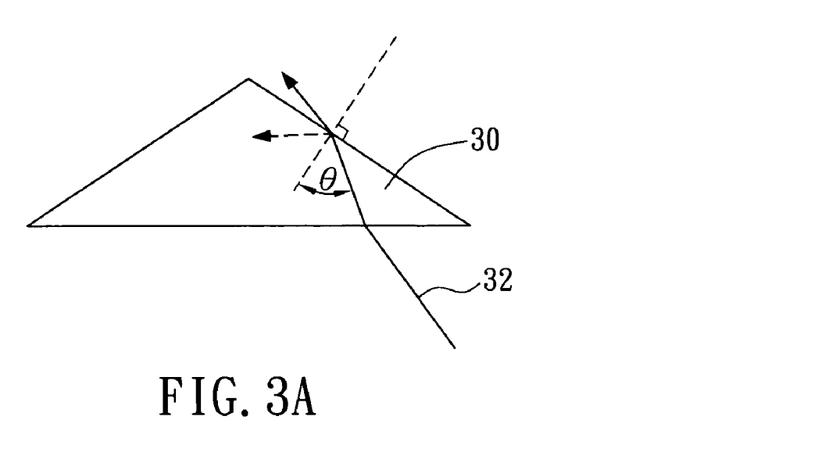
FIG. 3A is a schematic diagram depicting the optical characteristics of a prism shaped lens.

According to Snell's Law, it is noted that a prism shaped lens can be used to collimate light effectively as seen in FIG. 3A, that is, it can reduce the divergent angle of an incident light. In FIG. 3A, when an incident light 32 traveling in the prism 30 is traveling across an interface from the prism 30 to the external environment by an angle of $\theta$, i.e. from a media with higher refractive index to another media with lower refractive index, at the condition that the incident angle $\theta$ is larger than the critical angle of total internal reflection, then the light is totally reflected off the interface following the dotted arrow of FIG. 3A, on the other hand, when the incident angle $\theta$ is smaller than the critical angle of total internal reflection, the exiting light, shown as the solid arrow of FIG. 3A, will bend away from the normal of the interface (i.e. the dotted line of FIG. 3A).

Figure 3B:
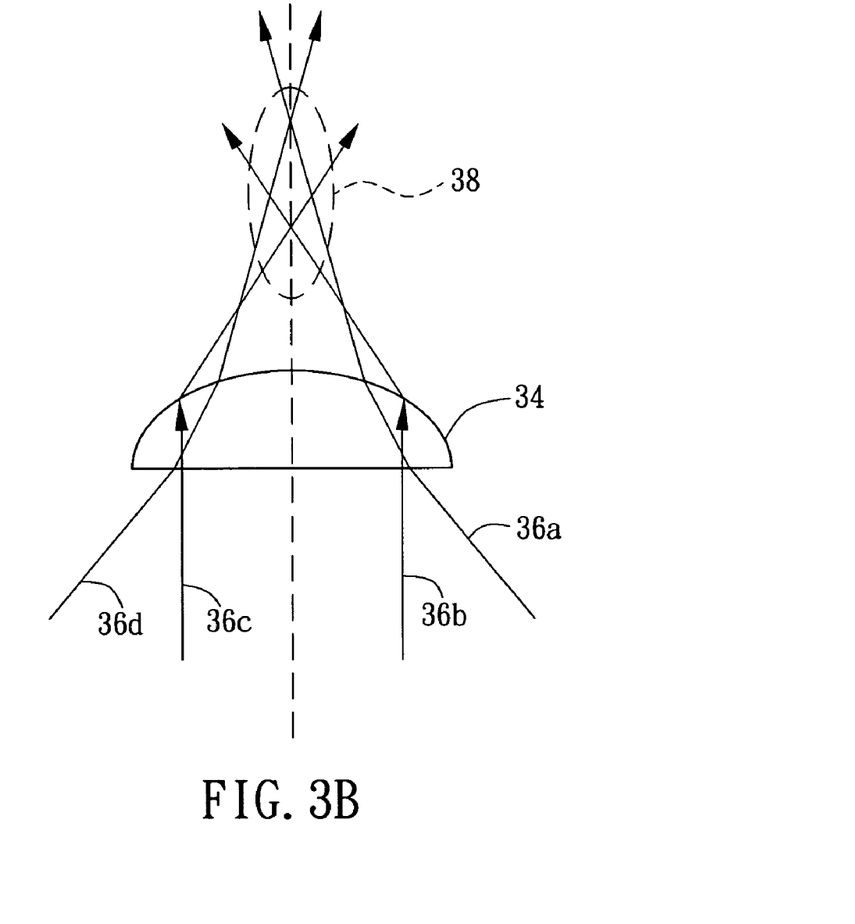
FIG. 3B is a schematic diagram depicting the optical characteristics of a semi-lenticular lens shaped lens.

Please refer to FIG. 3B, which is a schematic diagram depicting the optical characteristics of a semi-lenticular lens shaped lens. It is noted that a semi-column shaped lens can be used to controllably diffuse light within a specific range. As seen in FIG. 3B, as four incident light 36a, 36b, 36c and 36d, each incident to the lens 34 by different angles, is traveling across an interface from the lens 34 to the external environment, all the exiting light corresponding respectively to the four incident light will converge in the convergence area 38 and then dissipate. Accordingly, the exiting angle of the light with large incident angle can be controlled to converge so as to enable all the incident light to be uniformly and controllably diffused.

Thus, by forming microstructures with the two above-mentioned geometric characteristics on a surface of a light modulation element, the light modulation element is enabled to collimate as well as diffuse light. Hence, by a superposed formation of the prisms and the semi-lenticular lens, the light modulation element is equipped with light collimation and diffusion capabilities.

Figure 4:
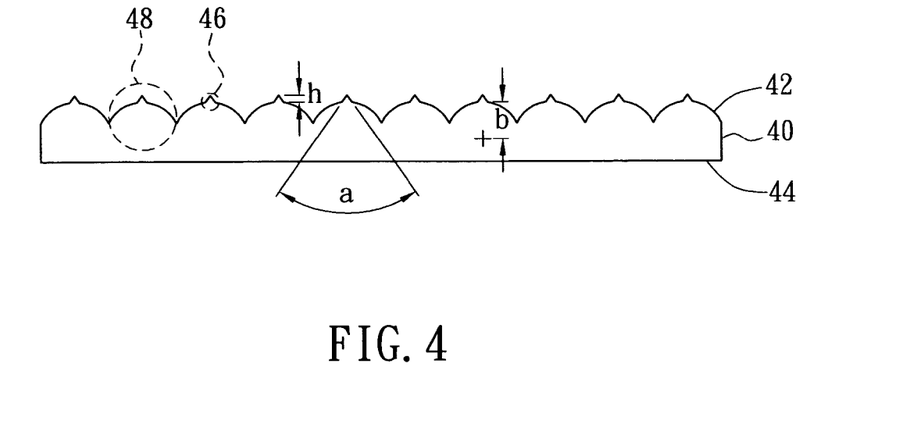
FIG. 4 is cross-sectional view of a light modulation element according to the present invention.

Please refer to FIG. 4, which is cross-sectional view of a light modulation element according to the present invention. The light modulation element 40 of the present invention has a first optical surface 42 and a second optical surface 44, wherein at least a semi-lenticular lens 48 is formed on the first surface 42 while forming at least a prism 46 on top of each semi-lenticular lens 48. The function of each prism 46 is to collimate light and thus is addressed as the collimation unit while the function of each semi-lenticular lens 48 is to scatter light and thus is addressed as the diffusion unit. Since each prism 46 is characterized by a vertex angle a and a height h, and the semi-lenticular lens is characterized by a specific depth b, the light collimation and diffusion capability of the light modulation element 40 can be controlled by the proper selection of the vertex angle a, the height h, the specific depth b, and the material of the light modulation element 40 (i.e. the refractive index of the light modulation element 40).

Figure 5:
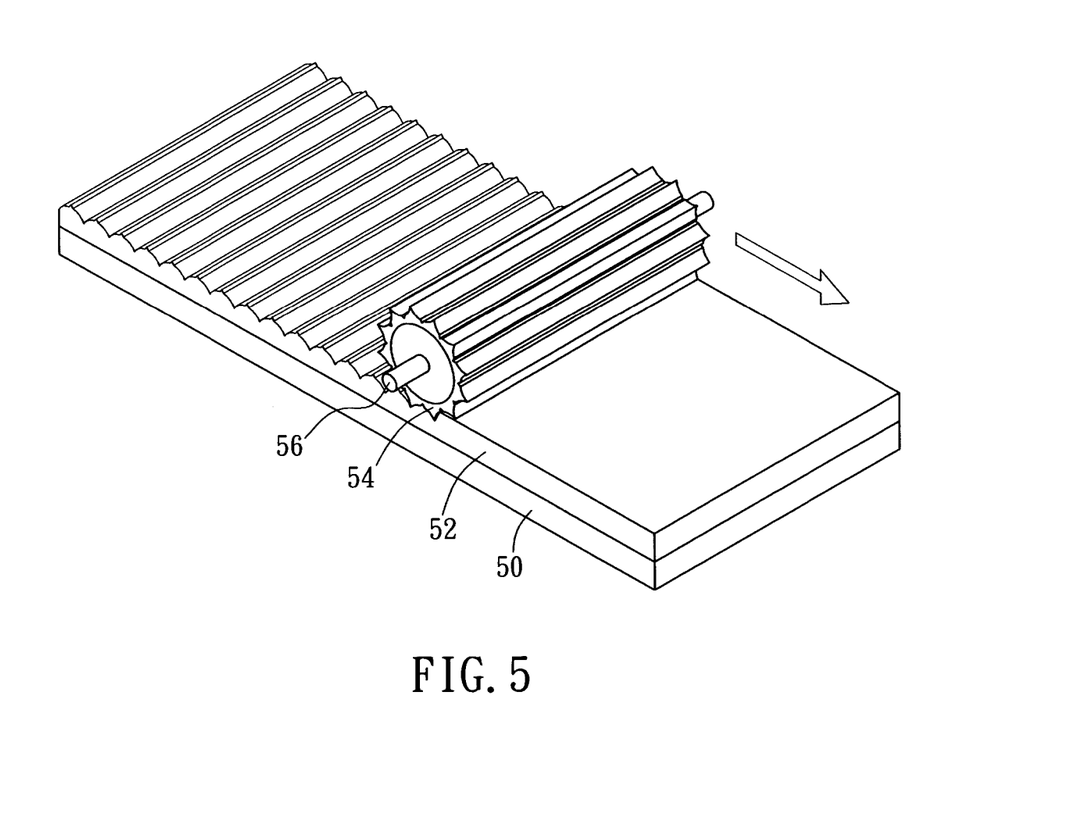
FIG. 5 is a schematic diagram showing a rolling process for manufacturing a light modulation element of the invention.

FIG. 5 depicts a process for manufacturing the light modulation element of the invention. The process for manufacturing the light modulation element of the invention comprises the steps of:

coating a layer of an UV curable material 52 on a flexible substrate 50;

rolling a roller 56 embossed with microstructures 54 on the layer of UV curable material 52 for patterning the UV curable material 52; and curing the layer of UV curable material 52.

Figure 6:
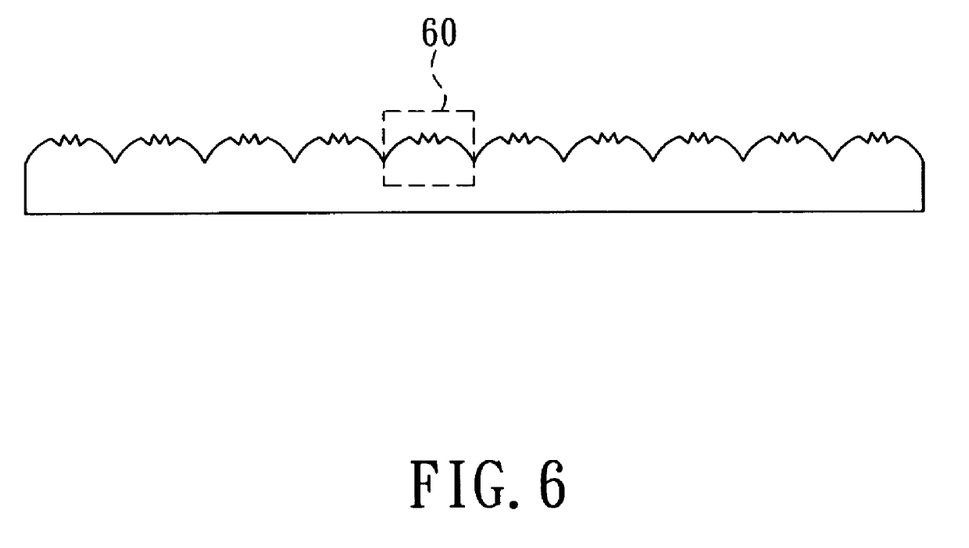
FIG. 6 is a cross-sectional view of a light modulation element according to a preferred embodiment of the invention.

In a preferred embodiment of the invention, the collimation unit of the invention can comprise more than one prism 46, which is similar to the diffusion unit. As seen in FIG. 6, a basic optical unit 60 of the light modulation element of the invention can comprises two prisms and one semi-lenticular lens, and so on.

Figure 7:
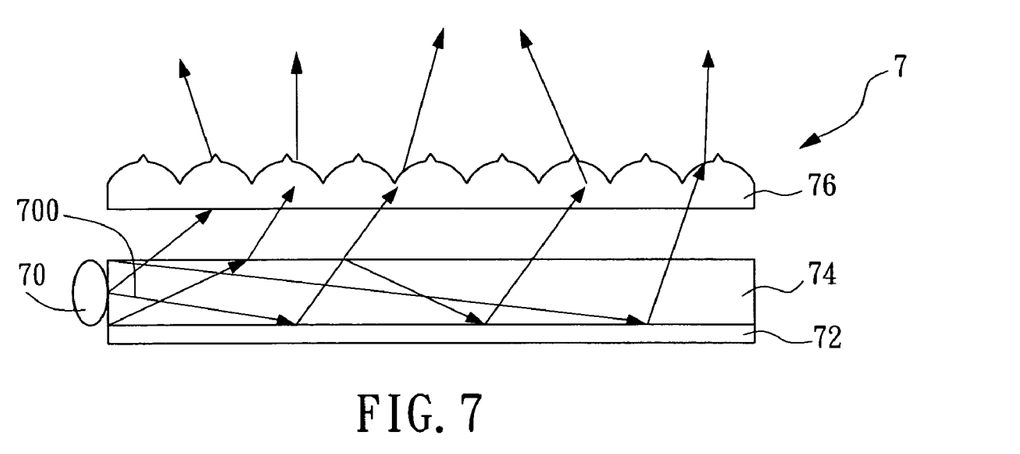
FIG. 7 is a cross-sectional view of a luminance control apparatus utilizing the light modulation element according to a preferred embodiment of the present invention.

Please refer to FIG. 7, which is a cross-sectional view of a luminance control apparatus utilizing the light modulation element of a preferred embodiment of the present invention. The luminance control apparatus 7 of the invention comprises a light source 70, a reflector 72, a light guide plate 74, and a light modulation element 76; wherein the light source 70 is arranged at a side of the light guide plate 74 for emitting an incident light 700 thereto; the light guide plate 74 is arranged over the reflector 72; and the light modulation element 76 is arranged at a position over the light guide plate 74; thereby the optical performance of the luminance control apparatus 7 is enhanced since the light modulation element 76 is capable of diffusing and collimating the incident light 700 simultaneously in a specific direction (i.e. a display utilizing the luminance control apparatus can either has a better vertical viewing angle or a better horizontal viewing angle).

Figure 8:
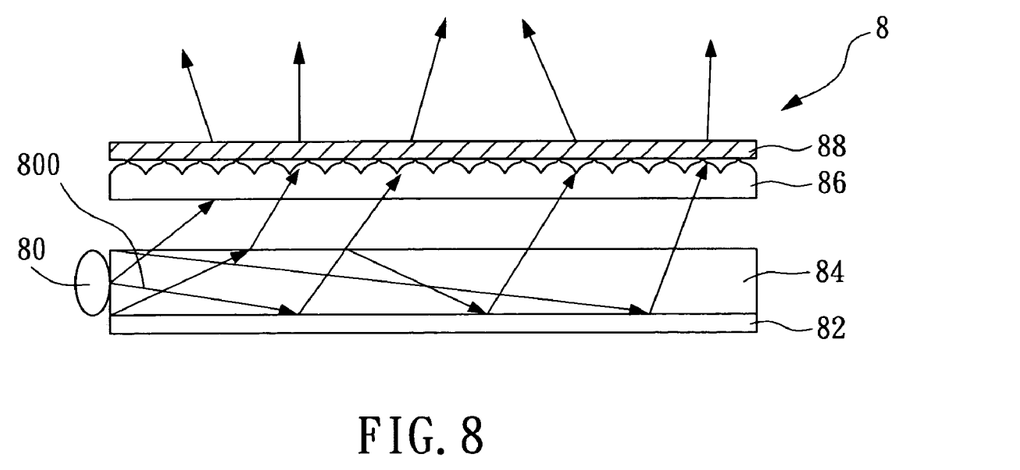
FIG. 8 is a cross-sectional view of a luminance control apparatus utilizing the light modulation element of another preferred embodiment of the present invention.
Figure 9:
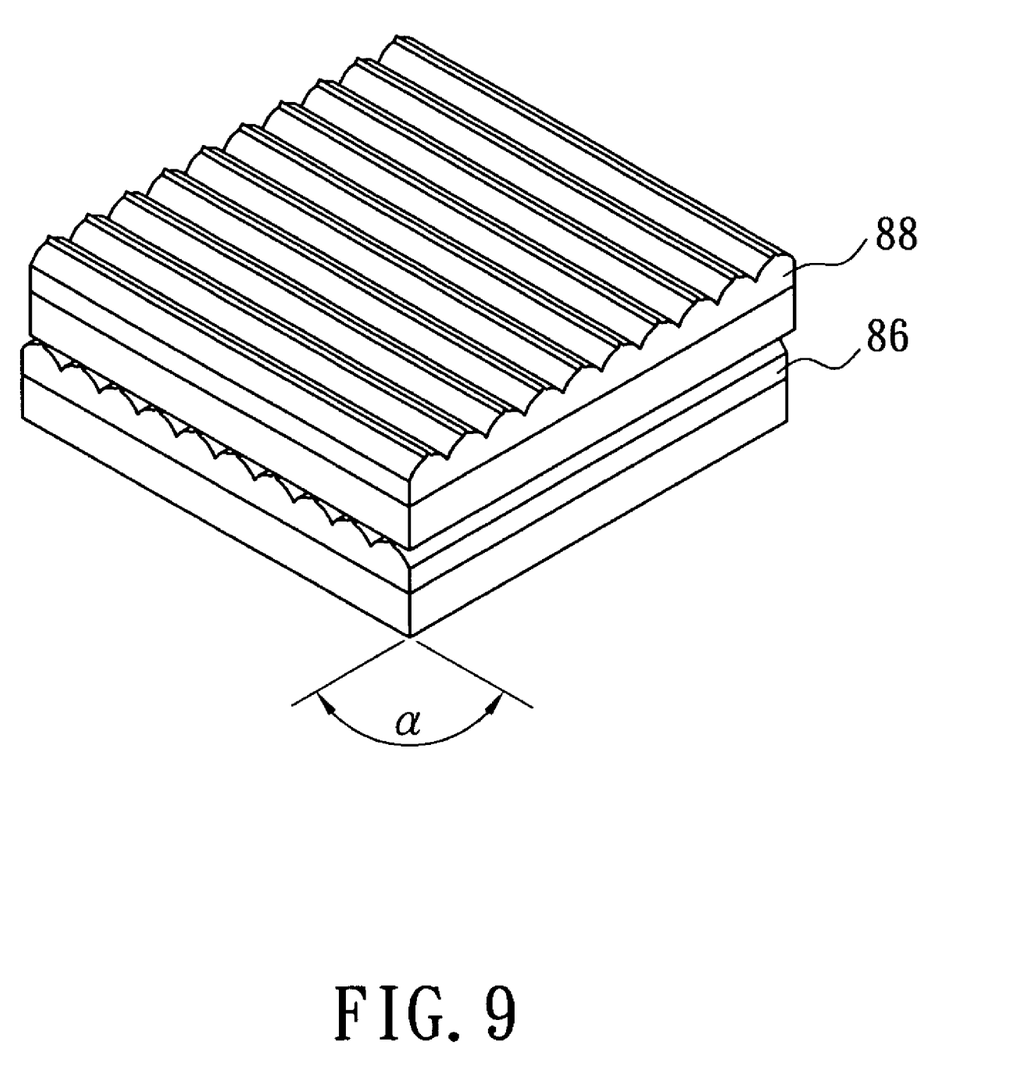
FIG. 9 is cross-sectional view of stacked light modulation elements according to the present invention.

Please refer to FIG. 8, which is a cross-sectional view of a luminance control apparatus utilizing the light modulation element of another preferred embodiment of the present invention. The luminance control apparatus 8 of the invention comprises a light source 80, a reflector 82, a light guide plate 84, and two light modulation elements 86, 88; wherein the light source 80 is arranged at a side of the light guide plate 84 for emitting an incident light 800 thereto; the light guide plate 84 is arranged over the reflector 82; and the orientation of the light modulation element 88 are being rotate by an angle α (as seen in FIG. 9) to be placed over the light modulation element 86 while the two stacked light modulation elements 86, 88 are arranged at a position over the light guide plate 84; thereby the optical performance of the luminance control apparatus 8 is enhanced since the light modulation element 86, 88 is capable of diffusing and collimating the incident light 800 simultaneously in two specific directions (i.e. the vertical viewing angle and the horizontal viewing angle of a display utilizing the luminance control apparatus can both be increased simultaneously).

Figure 10:
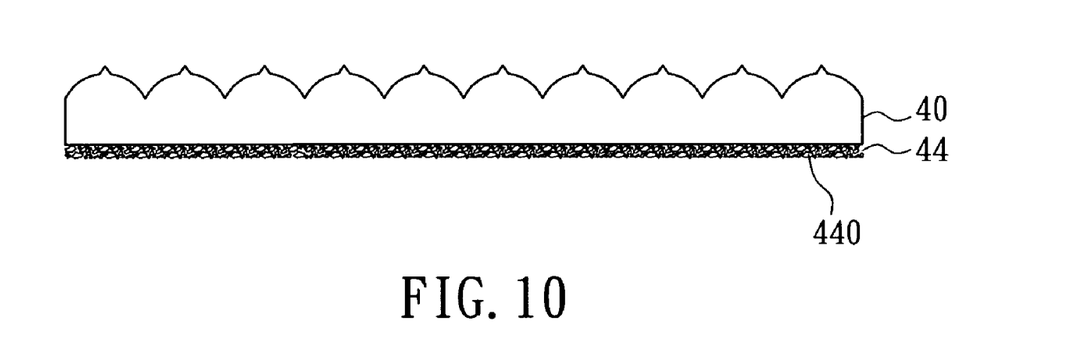
FIG. 10 is cross-sectional view of a light modulation element according to another preferred embodiment of the present invention.
Figure 11:
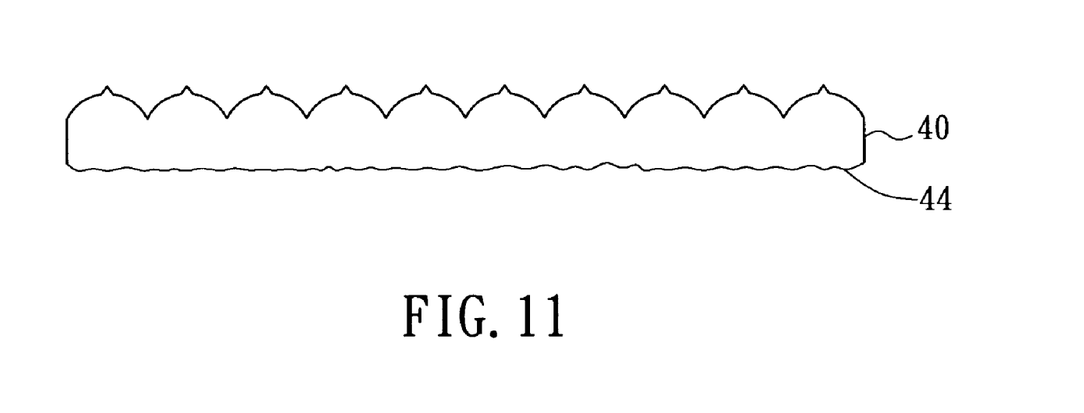
FIG. 11 is cross-sectional view of a light modulation element according to yet another preferred embodiment of the present invention.

In a preferred embodiment of the invention, the a semi-lenticular lens is characterized by a specific depth preferably in the range of 5 microns to 500 microns, and a prism is characterized by a vertex angle, preferably in the range of 30° to 140°, and a height, preferably in the range of 0 micron to 500 microns. Moreover, as seen respectively in FIG. 11 and FIG. 10, the second optical surface can be an optical surface selected from the group consisting of a rugged surface and a smooth surface. When the second optical surface is designed as a rugged surface, the rugged surface either can be integrally formed while manufacturing the light modulation element, or can be formed by coating a layer of resin with particles 440 dispersed therein. Furthermore, in another preferred embodiment of the invention, when the luminance control apparatus of the invention comprises two light modulation elements, the orientation of one of the two light modulation elements is being rotated by an angle in the range of 0° to 90° to be placed overlapping another light modulation element.

From the above description, it is noted that the light modulation element of the invention is equipped with functions of light collimation and diffusion simultaneously, which can be used as the replacement for a conventional brightness enhancement film and a diffuser. Moreover, as the light modulation element of the invention is being applied in a luminance control apparatus like a backlight module, not only the luminous efficacy of the backlight module is enhanced, but also the manufacturing cost of the backlight module is reduced because of the structure of the same is simplified.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An light modulation element, having a first optical surface and a second optical surface for receiving an incident light, the light modulation element comprising:
   at least a transparent diffusion unit, for diffusing the incident light, each being formed on the first optical surface; and
   at least a transparent collimation unit, for collimating the incident light, each being superposed on the diffusion unit.

2. The light modulation element of claim 1, wherein the diffusion unit further comprises at least one semi-lenticular lens.

3. The light modulation element of claim 2, wherein the at least one semi-lenticular lens is characterized by a specific depth.

4. The light modulation element of claim 3, wherein the specific depth is in the range of 5 microns to 500 microns.

5. The light modulation element of claim 3, wherein a plurality of prisms is formed on top of each of at least one semi-lenticular lens.

6. The light modulation element of claim 1, wherein the collimation unit further comprises at least a prism.

7. The light modulation element of claim 6, wherein prism is characterized by a vertex angle and a height.

8. The light modulation element of claim 7, wherein the vertex angle is in the range of 30° to 140°.

9. The light modulation element of claim 7, wherein the height is in the range of 0 micron to 500 microns.

10. The light modulation element of claim 1, wherein the second optical surface is a smooth surface.

11. The light modulation element of claim 1, wherein the second optical surface is a rugged surface.

12. The light modulation element of claim 1, wherein the light modulation element is formed by a method comprising the steps of:
    coating a layer of an UV curable material 52 on a flexible substrate 50;
    rolling a roller 56 embossed with microstructures 54 on the layer of UV curable material 52 for patterning the UV curable material 52; and
    curing the layer of UV curable material 52.

13. A luminance control apparatus, comprising:
    a reflector;
    a light guide plate, arranged over the reflector;
    at least a light source, arranged at a side of the light guide plate for emitting an incident light; and
    at least a light modulation element, arranged at a position over the light guide plate, each having a first optical surface and a second optical surface for receiving the incident light, each light modulation element further comprising:
      at least a transparent diffusion unit, for diffusing the incident light, each being formed on the first optical surface; and
      at least a transparent collimation unit, for collimating the incident light, each superposed on the diffusion unit.

14. The light modulation element of claim 13, wherein the diffusion unit further comprises:
    at least a semi-lenticular lens, characterized by a specific depth.

15. The light modulation element of claim 13, wherein the collimation unit further comprises:
    at least a prism, characterized by a vertex angle and a height.

16. The light modulation element of claim 13, wherein the second optical surface is a smooth surface.

17. The light modulation element of claim 13, wherein the second optical surface is a rugged surface.

18. The light modulation element of claim 13, comprising two light modulation elements, wherein the orientation of one of the two light modulation elements is being rotate by an angle in the range of 0° to 90° to be placed overlapping another light modulation element.

19. The light modulation element of claim 18, wherein the second optical surface is the rugged surface integrally formed with the light modulation element.

20. The light modulation element of claim 18, wherein the second optical surface is substantially the rugged surface coated on a surface of the light modulation element.

* * * * *